UNITED STATES PATENT OFFICE.

ERNST BRYK, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PROCESS OF MAKING ARYLTHIOGLYCOLLIC-ORTHOCARBOXYLIC ACIDS.

No. 877,702.     Specification of Letters Patent.     Patented Jan. 28, 1908.

Application filed April 2, 1907. Serial No. 365,956. (Specimens.)

*To all whom it may concern:*

Be it known that I, ERNST BRYK, Ph.D., chemist, a citizen of the Empire of Austria-Hungary, and residing at Höchst-on-the-Main, Germany, have invented certain new and useful Improvements in Making Arylthioglycollic-Orthocarboxylic Acids, of which the following is a specification.

In German Patent No. 69,073 and *Berichte* XXXI, 1666 it is stated that by the action of diazotized anthranilic acid on hydrogen sulfid, metal sulfhydrates or metal sulfids, dithiosalicylic acid is obtained of the composition

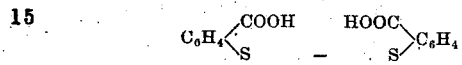

A body of such composition has no hydrogen-atom linked to sulfur and consequently ought not to react with chloracetate in the sense of forming phenylthioglycollic-ortho-carboxylic acid.

I have found that by diazotizing anthranilic acid or its substitution products and by allowing the diazo solution to run into a solution of Na$_2$S in water, alcohol or other solvent, sulfurous products of reaction are obtained in the alkaline solution which combine with chloracetates and permit of phenylthioglycollic-ortho-carboxylic acids or their substitution products being obtained.

Example I. 137 grams of anthranilic acid are diazotized in 200 grams of concentrated hydrochloric acid and 1200 grams of water with 70 grams of sodium nitrite; the solution neutralized with sodium carbonate is allowed to run in small quantities at low temperature, say about 0–10° C. into a solution of 240 grams of crystallized sodium sulfid in 500 grams of water, preferably waiting for each quantity introduced to become decomposed. There is added a solution of sodium chloracetate, obtained from 100 grams of chloracetic acid, 100 grams of water, 114 grams of caustic soda-lye of 40° Bé, and then 114 grams of caustic soda-lye. The whole is heated on the water-bath for some time, for instance, one hour and from the solution the phenylthioglycollic-orthocarboxylic acid is precipitated by means of hydrochloric acid. It may also be obtained in a pure state by crystallisation from alcohol and the like.

Example II. 151 grams of homoanthranilic acid COOH:NH$_2$:CH$_3$ = 1:2:4 are diazotized in 200 grams of concentrated hydrochloric acid and 1200 grams of water with 70 grams of sodium nitrite; the solution neutralized with sodium carbonate is allowed to run in small quantities at low temperature, say about 0–10° C. into a solution of 240 grams of crystallized sodium sulfid in 500 grams of water. On the reaction being complete there is added a solution of sodium chloracetate, obtained from 100 grams of chloracetic acid, 100 grs. of water, 114 grams of caustic soda-lye of 40° Bé specific gravity and then further 114 grams of caustic soda-lye. The whole is heated on the water-bath for some time, for instance, one hour, and from the solution the methyl-phenylthioglycollic-ortho-carboxylic acid is precipitated by means of an acid. It may be purified by dissolving in alcohol.

Having now described my invention, what I claim is:—

The process herein described of making arylthioglycollic - ortho - carboxylic acids, which consists in treating diazotized neutralized ortho-amidobenzoic acids with alkali-sulfids and in then heating with chloracetates in alkaline solution.

In testimony that I claim the foregoing as my invention, I have signed my name in presence of two subscribing witnesses.

ERNST BRYK.

Witnesses:
   JEAN GRUND,
   CARL GRUND.